(12) United States Patent
Takahashi et al.

(10) Patent No.: US 9,787,094 B2
(45) Date of Patent: Oct. 10, 2017

(54) ELECTRIC POWER DEMAND REGULATING SYSTEM, ELECTRIC POWER DEMAND REGULATING DEVICE, AND ELECTRIC POWER DEMAND REGULATING METHOD

(71) Applicant: HITACHI, LTD., Tokyo (JP)

(72) Inventors: Hirotaka Takahashi, Tokyo (JP); Yasushi Tomita, Tokyo (JP); Ikuma Sugamata, Tokyo (JP); Akira Kobayashi, Tokyo (JP); Tsukasa Onishi, Tokyo (JP); Takafumi Ebara, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 576 days.

(21) Appl. No.: 14/366,112

(22) PCT Filed: Nov. 28, 2012

(86) PCT No.: PCT/JP2012/080663
§ 371 (c)(1),
(2) Date: Jun. 17, 2014

(87) PCT Pub. No.: WO2013/094374
PCT Pub. Date: Jun. 27, 2013

(65) Prior Publication Data
US 2014/0327309 A1 Nov. 6, 2014

(30) Foreign Application Priority Data

Dec. 22, 2011 (JP) .................................. 2011-280824

(51) Int. Cl.
*H02J 3/14* (2006.01)
*H02J 13/00* (2006.01)
(Continued)

(52) U.S. Cl.
CPC .......... *H02J 3/14* (2013.01); *G06Q 10/06312* (2013.01); *G06Q 50/06* (2013.01);
(Continued)

(58) Field of Classification Search
CPC ............................ G06C 50/06; Y02B 70/3266
See application file for complete search history.

(56) References Cited

U.S. PATENT DOCUMENTS 4,204,127 A   5/1980  Carter, II
7,136,725 B1 * 11/2006 Paciorek ................... H02J 3/14
                                                        700/295
(Continued)

FOREIGN PATENT DOCUMENTS

EP   2048757 A1    4/2009
EP   2383864 A2   11/2011
(Continued)

OTHER PUBLICATIONS

Tyagi, et.al., " EEmergency demand response for distribution system emergencies," Apr. 19022, 2010, IEEE Transmission and distribution Conference and Exposition, pp. 1-4.*
(Continued)

*Primary Examiner* — Thienvu Tran
*Assistant Examiner* — Pinping Sun
(74) *Attorney, Agent, or Firm* — Mattingly & Malur, PC

(57) ABSTRACT

A power demand regulation system has a power demand regulation device that regulates the load applied to equipment of an electrical power system by a load apparatus operating by means of power from the electrical power system, which supplies power to consumers. When regulating the load to the equipment, the power demand regulation device selects a load apparatus as the subject of a request for an alteration of operating state on the basis of by-apparatus load information, which is information of each load appa-
(Continued)

ratus, and a regulation target value, which is the amount of load that is to be regulated, and, in the period from the start to the end of regulation, executes a plurality of times the outputting of an alteration request that requests the alteration of the operating state of the selected load apparatus.

20 Claims, 7 Drawing Sheets

(51) Int. Cl.
*G06Q 10/06* (2012.01)
*G06Q 50/06* (2012.01)

(52) U.S. Cl.
CPC ..... *H02J 13/0006* (2013.01); *H02J 2003/143* (2013.01); *Y02B 70/3225* (2013.01); *Y02B 70/3266* (2013.01); *Y04S 20/222* (2013.01); *Y04S 20/242* (2013.01); *Y10T 307/406* (2015.04)

(56) References Cited

U.S. PATENT DOCUMENTS

| | | | | |
|---|---|---|---|---|
| 7,622,894 | B2* | 11/2009 | Kawahara | G01R 31/3624 |
| | | | | 320/127 |
| 8,855,829 | B2* | 10/2014 | Golden | G05B 15/02 |
| | | | | 700/291 |
| 2003/0020333 | A1* | 1/2003 | Ying | H01H 61/02 |
| | | | | 307/38 |
| 2004/0075343 | A1* | 4/2004 | Wareham | H02J 3/14 |
| | | | | 307/39 |
| 2009/0195070 | A1* | 8/2009 | Takegami | F24F 11/0086 |
| | | | | 307/31 |
| 2010/0241285 | A1 | 9/2010 | Johnson et al. | |
| 2010/0314942 | A1 | 12/2010 | Talkin et al. | |
| 2011/0099403 | A1* | 4/2011 | Miyata | G06F 1/32 |
| | | | | 713/323 |
| 2011/0184579 | A1 | 7/2011 | Nilsen et al. | |
| 2011/0238232 | A1 | 9/2011 | Tomita et al. | |
| 2011/0282505 | A1 | 11/2011 | Tomita et al. | |
| 2012/0019058 | A1* | 1/2012 | Goodermuth | B60L 11/02 |
| | | | | 307/9.1 |
| 2012/0056712 | A1* | 3/2012 | Knode | H05B 37/0272 |
| | | | | 340/3.7 |
| 2013/0311236 | A1 | 11/2013 | Takahashi et al. | |

FOREIGN PATENT DOCUMENTS

| | | | |
|---|---|---|---|
| EP | 2388883 A1 | 11/2011 | |
| JP | 09-200963 A | 7/1997 | |
| JP | 2008-125295 A | 5/2008 | |
| JP | 2009-247043 A | 10/2009 | |
| JP | 2010-166636 A | 7/2010 | |
| JP | WO 2011152021 A1 * | 12/2011 | ............ G06Q 50/06 |
| JP | 2012-151992 A | 8/2012 | |
| JP | 2013-046451 A | 3/2013 | |
| WO | 2010/048993 A1 | 5/2010 | |

OTHER PUBLICATIONS

European Search Report received in corresponding European Application No. 12858789.6 dated Sep. 8, 2015.
R. Tyagi et al., "Emergency Demand Response for Distribution System Contingencies", GE Global Research, IEEE 2010.
International Search Report Issued in International Application No. PCT/JP2012/080663, dated Feb. 26, 2013.

* cited by examiner

FIG. 3
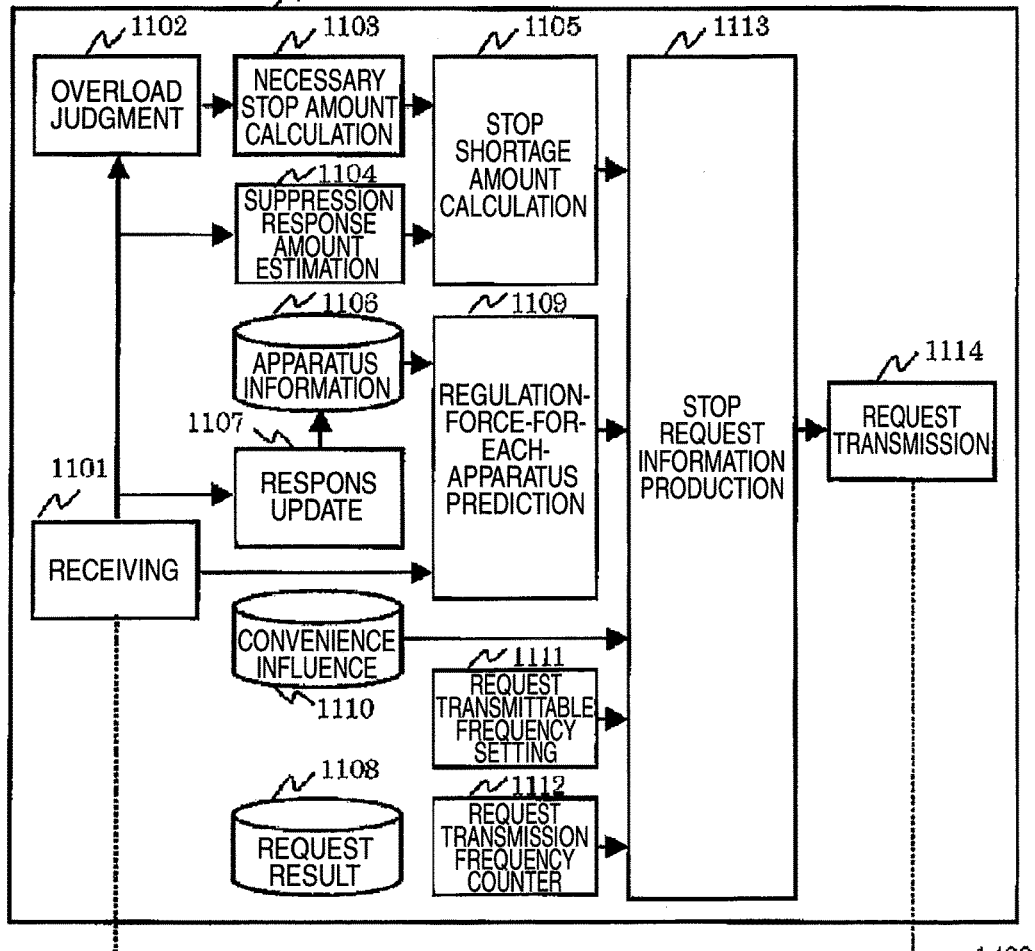
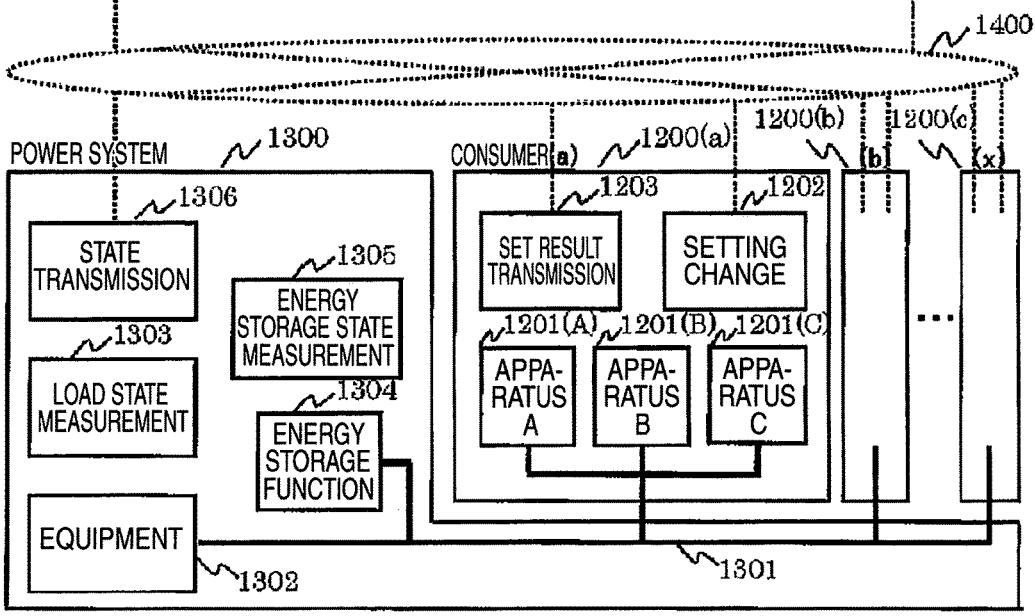

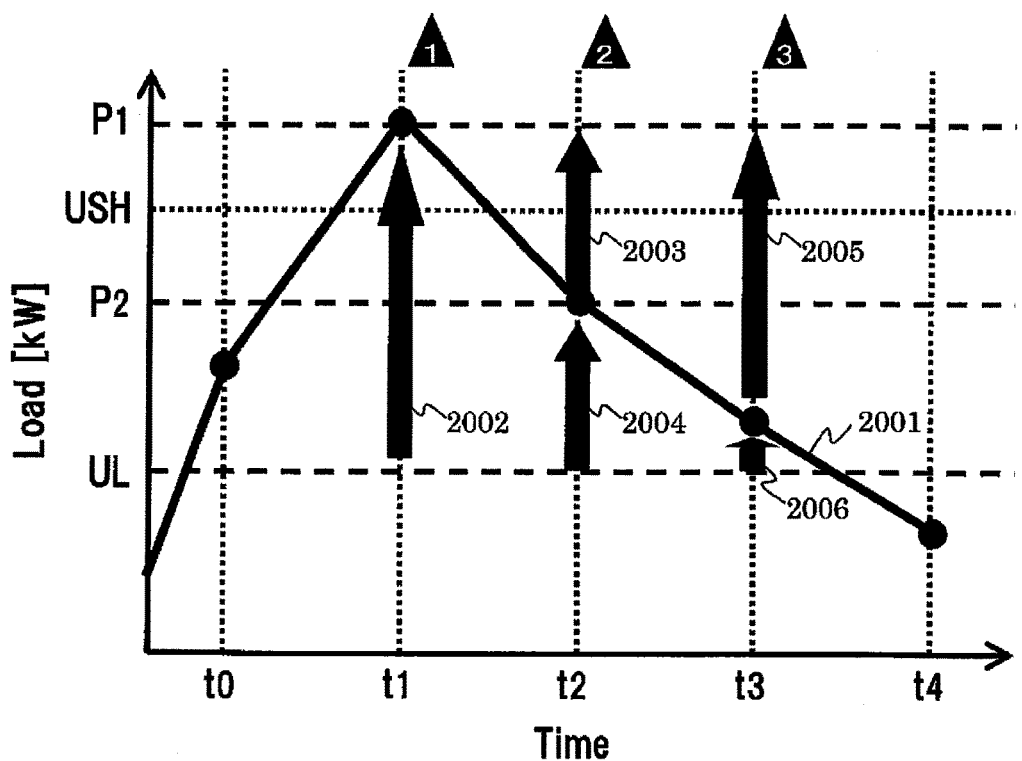

FIG. 7

| DATE | CONTROL START TIME | REQUEST SEQUENCE NUMBER | CONSUMER ID | APPARATUS CLASSIFI- CATION | APPARATUS ID | REQUEST CONTENTS |
|---|---|---|---|---|---|---|
| 2011/11/12 | 13:00 | 1 | 001 | WATER HEATER | 00A | OFF |
| 2011/11/12 | 13:00 | 1 | 005 | WATER HEATER | 00A | OFF |
| 2011/11/12 | 13:00 | 1 | 010 | WATER HEATER | 00A | OFF |

FIG. 8

| APPARATUS CLASSIFICATION | CONVENIENCE DETERIORATION LEVEL |
|---|---|
| SYSTEM ENERGY STORAGE DEVICE | 0 |
| WATER HEATER | 1 |
| EV CHARGING | 2 |
| AIR CONDITIONER | 3 |

US 9,787,094 B2

ELECTRIC POWER DEMAND REGULATING SYSTEM, ELECTRIC POWER DEMAND REGULATING DEVICE, AND ELECTRIC POWER DEMAND REGULATING METHOD

TECHNICAL FIELD

The present invention relates to a demand response technique in a power system for supplying electric power to consumers.

BACKGROUND ART

In the future, it is expected that electric vehicles and plug-in type hybrid vehicles are spread, so that it is considered that load applied to equipment such as distribution substations and pole transformers in the power system which supplies electric power to consumers is increased. In the power system, when the load exceeding a permissible value is applied to the equipment, a variety of trouble occurs to be exposed to danger. For example, when the load exceeding the permissible value is applied to the distribution substation, a breaker in the distribution substation is operated, so that an outage occurs in the whole region. Further, when the load exceeding the permissible value is applied to the pole transformer, the pole transformer is sometimes burned and damaged.

As the technique of solving such an overload state, there is a technique disclosed in the non-patented literature 1. In the technique of the non-patented literature 1, first, when the overload state of the pole transformer is detected, a load control volume required to solve the overload is calculated. Next, an amount of load to be reduced when apparatuses of consumers constituting the load are stopped, that is, power sources are cut off is predicted. Until the load control volume required to solve the overload state is reached, the amount of load reduced by stopping the apparatuses of consumers is added up. The apparatuses of consumers requested to be stopped are decided on the basis of the added-up results and a stop request signal is transmitted to the relevant apparatuses of consumers. The apparatuses of consumers which receive the stop request signal cut off their power sources. Consequently, the load on the equipment is reduced to solve the overload state.

CITATION LIST

Non Patent Literature

NON PATENT LITERATURE 1: "Emergency Demand Response for Distribution System Contingencies", (GE Global Research) IEEE 2010

SUMMARY OF INVENTION

Technical Problem

In the technique of the above non-patented literature 1, the amount of load capable of being reduced if the apparatuses of consumers are stopped is predicted to be added for each apparatus and the amount of load to be reduced as a whole is ensured, so that the stop request signal is transmitted to the apparatuses of consumers to be stopped.

Accordingly, the accuracy of the whole load control volume obtained by adding up the amount of load capable of being reduced in the apparatuses of consumers depends on the prediction accuracy of the amount of load to be reduced when the apparatuses of consumers are stopped. When a number of apparatuses of consumers are stopped, it is considered that errors in the amount of load of apparatuses of consumers are added up, so that the whole load control volume is scattered widely.

As a result, when the amount of load reduced actually are lacking as compared with the amount of load to be reduced, the outage is continued as before or the dangerousness which damages the equipment remains continuously. Further, conversely, when the load is actually reduced excessively as compared with the amount of load to be reduced, deterioration in convenience is forced to consumers beyond necessity.

It is an object of the present invention to provide a technique of improving the accuracy of regulation for demand in a power system.

Solution to Problem

The electric power demand regulating system according to an aspect of the present invention, which regulates load applied to equipment of a power system by load apparatuses operated by electric power from the power system which supplies electric power to consumers, comprises an electric power demand regulating device which makes selection of a load apparatus to be requested to make a change of an operation state on the basis of a regulation target value which is an amount of load to be regulated and load information for each apparatus which is information of each load apparatus when the load on the equipment is regulated and outputting of a change request for requesting to make a change of the operation state of the selected load apparatus plural times during a period from start to completion of regulation.

Further, the electric power demand regulating device may update the regulation target value after the change request is outputted and select the load apparatus to be requested to make a change of the operation state at a next change request on the basis of the updated regulation target value.

Moreover, the electric power demand regulating device may select the load apparatus to be requested to make a change of the operation state on the basis of the regulation target value, the load information for each apparatus and degree of change in convenience of the consumers in case where the operation state of the load apparatuses is changed.

Furthermore, the electric power demand regulating device may maintain a response rate representing a probability that the operation state is changed when the change request is received for each category of the load apparatuses while updating the response rate and select the load apparatus to be requested to make a change of the operation state on the basis of the regulation target value, the load information for each apparatus and the response rate.

Further, the electric power demand regulating device may count the change requests outputted from start time of the regulation and change a selection rule for selecting the load apparatus to be requested to make a change of the operation state when the count reaches a predetermined threshold value.

Moreover, the electric power demand regulating device may select the load apparatus having large rated power preferentially before the count reaches the threshold value and select the load apparatus having the high response rate preferentially after the count reaches the threshold value.

Furthermore, the load apparatuses may include electrical apparatuses installed in the consumers connected to the power system and operated by electric power from the power system and storage battery systems connected to the power system and making accumulation of electricity from the power system and discharge of electricity to the power system.

Advantageous Effects of Invention

According to the present invention, the accuracy of regulation for demand in the power system can be improved.

BRIEF DESCRIPTION OF DRAWINGS

FIG. 3 is a block diagram schematically illustrating an electric power demand regulating system according to a second embodiment.

FIG. 4 is a graph showing an example of the state of change in load applied to equipment of a power system.

FIG. 5 is a diagram showing an example of a table format stored in an apparatus information DB.

FIG. 7 is a diagram showing an example of a table stored in a request result DB.

FIG. 8 is a diagram showing an example of a table format stored in a convenience influence DB.

DESCRIPTION OF EMBODIMENTS

An electric power demand regulating system according to embodiments of the present invention is described with reference to the drawings.

First Embodiment

Figure 1:
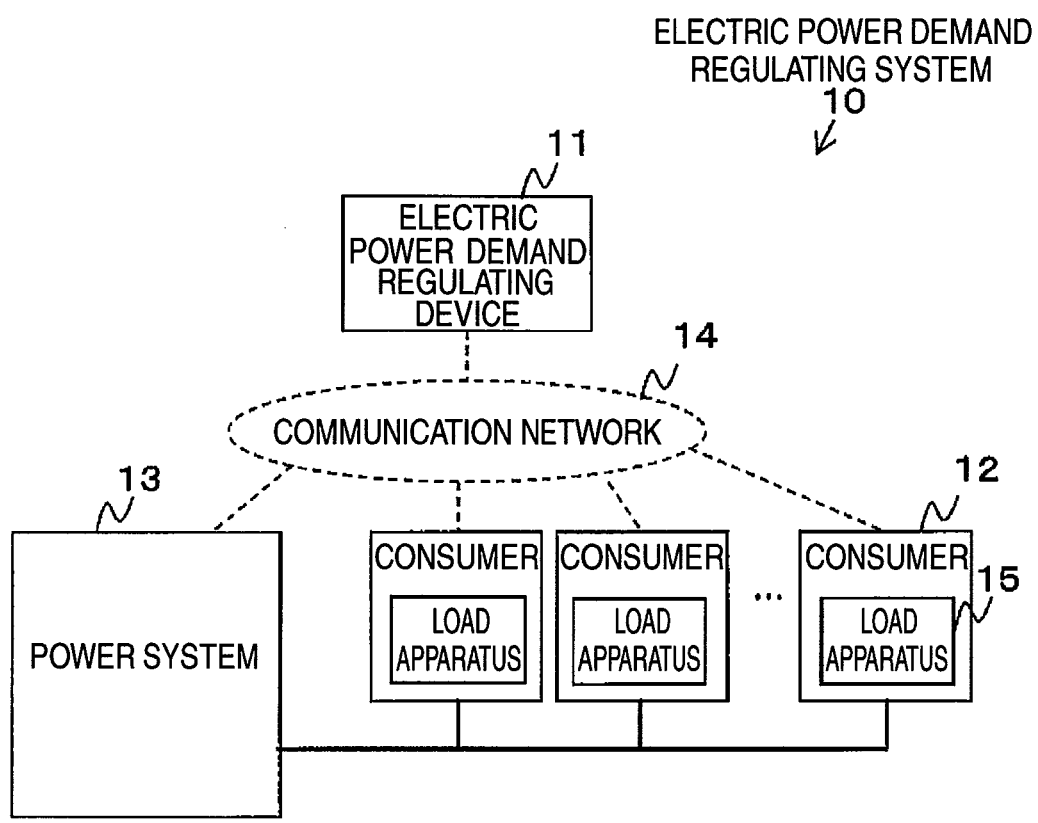
FIG. 1 is a block diagram schematically illustrating an electric power demand regulating system according to a first embodiment.

FIG. 1 is a block diagram schematically illustrating an electric power demand regulating system according to a first embodiment. Referring to FIG. 1, the electric power demand regulating system 10 includes an electric power demand regulating device 11 connected through a communication network 14 to a power system 13 and consumers 12.

The power system 13 is a system for supplying electric power to the consumers 12.

The consumers 12 include load apparatuses 15 which are electrical apparatuses operated by electric power from the power system 13. The load apparatuses 15 are apparatuses of which electric power consumption, that is, the amount of load applied to the power system 13 is changed depending on the operation state. For example, when a power source of the load apparatus 15 is turned on, the power system 13 is loaded and when the power source is turned off, the power system 13 is not loaded.

The electric power demand regulating device 11 is a device which regulates the load applied to the equipment of the power system 13 by the load apparatuses 15. For example, when the load applied to the power system 13 becomes excessive state (overload state), regulation of the load is started. When the amount of load is reduced to a proper value, the regulation of the load is completed.

Here, only the electrical apparatuses installed in the consumers 12 are defined as the load apparatuses 15 but other apparatuses may be contained as the load apparatuses 15. For example, the load apparatuses 15 may contain electrical apparatuses installed in the consumers 12 connected to the power system 13 and operated by electric power from the power system 13 and storage battery systems connected to the power system to make accumulation of electricity from the power system and discharge of electricity to the power system 13.

When the electric power demand regulating device 11 regulates the load applied to the equipment of the power system 13, the electric power demand regulating device 11 performs the following processing plural times during the period from start to completion of the regulation.

The electric power demand regulating device 11 first selects a load apparatus to be requested to make a change of operation state on the basis of a regulation target value which is the amount of load to be regulated and load information for each apparatus which is information of each of the load apparatuses 15. The regulation target value is a difference between a proper value of the amount of load applied to the equipment of the power system 13 and the amount of load actually applied to the equipment at present. The proper value may be a maximum load within the permissible range of the equipment in order to maintain the convenience for the consumers 12 as high as possible even if the load is regulated, for example. Then, the electric power demand regulating device 11 produces a change request for requesting change of the operation state of the selected load apparatus 15. A typical example of change of the operation state is to turn off the power source of the load apparatus 15 which is the electrical apparatus. As another example, transition to a power-saving mode of the electrical apparatus is contained in change of the operation state.

When the consumers 12 accept the change request, the consumers 12 change the operation state of the load apparatuses 15 in accordance with the request.

According to the embodiment, since the load on the load apparatus 15 is regulated by plural change requests, the amount of load applied to the equipment of the power system 13, that is, the regulation accuracy of demand in the power system 13 can be improved.

Figure 2:
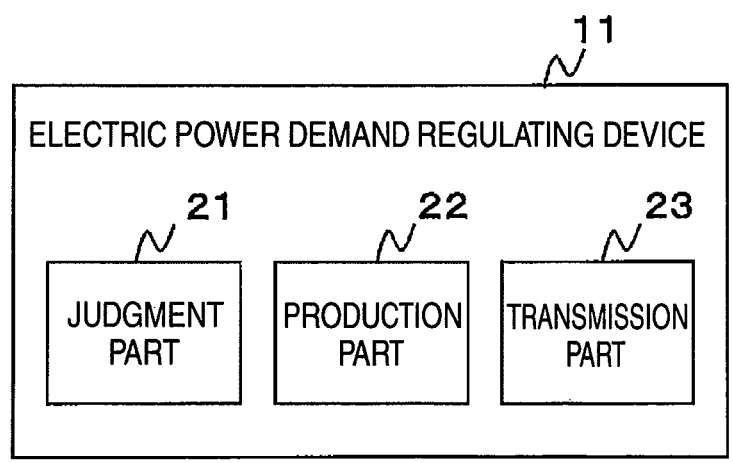
FIG. 2 is a block diagram schematically illustrating a basic configuration of an electric power demand regulating device 11 according to the first embodiment.

FIG. 2 is a block diagram schematically illustrating a basic configuration of the electric power demand regulating device 11 according to the first embodiment. Referring to FIG. 2, the electric power demand regulating device 11 includes a judgment part 21, a production part 22 and a transmission part 23.

The judgment part 21 decides implementation of regulation of the load applied to the equipment of the power system 13 on the basis of the load. The production part 22 selects the load apparatus 15 to be requested to make a change of the operation state on the basis of the regulation target value and the load information for each apparatus and produces the change request for requesting change of the operation state of the selected load apparatus 15. The transmission part 23 outputs or transmits the change request produced by the production part 22 to the consumers 13.

When the implementation of regulation of the load is decided by the judgment part 21, the production part 22 produces the change request plural times during the period from start to completion of the regulation and the transmission part 23 transmits the change request each time the request is produced by the production part 22.

When the electric power demand regulating device 11 produces the change request to thereby regulate the load, the load applied to the power system 13 is changed. Thus, the electric power demand regulating device 11 repeats the processing of updating the regulation target value in accordance with the change of the load, selecting the load apparatus to be requested to make a change of the operation state at a next change request on the basis of the updated regulation target value and outputting the change request. In this manner, the regulation result can be fed back to thereby bring the amount of load applied to the power system 13 near to the proper value exactly.

Further, the electric power demand regulating device 11 may select the load apparatus 15 to be requested to make a change of the operation state on the basis of not only the regulation target value and the load information for each apparatus but also the degree of change in convenience of the consumers 12 in case where the operation state of the load apparatuses 15 is changed. Consequently, the load can be reduced while maintaining the convenience of the consumers 12 as high as possible.

Moreover, the electric power demand regulating device 11 may maintain a response rate representing the probability that the operation state is changed when the change request is received for each category of the load apparatuses 15 while updating the response rate. In this case, the electric power demand regulating device 11 may select the load apparatus to be requested to make a change of the operation state on the basis of not only the regulation target value and the load information for each apparatus but also the response rate. For example, when the change request is issued to the load apparatus 15 of the category having the higher response rate, the prediction accuracy of the reduction amount of load can be improved and accordingly the reduction amount near to the prediction value can be obtained.

Further, the electric power demand regulating device 11 may count the change requests produced from start time of regulation and when the count reaches a predetermined threshold value, the selection rule for selecting the load apparatus 15 to be requested to make a change of the operation state may be changed. Thus, different selection rules can be used in the first and second halves of the regulation period to thereby regulate the load applied to the equipment of the power system 13 flexibly.

Further, in that case, the electric power demand regulating device 11 may select the load apparatus 15 having larger rated power preferentially before the count reaches the threshold value and may select the load apparatus 15 having higher response rate preferentially after the count reaches the threshold value. By doing so, in the first half of the regulation period, the change can be requested to the load apparatus 15 having the large load reduction effect in case where the power source is turned off, so that the load can be regulated efficiently, while in the second half of the regulation period, the change can be requested to the load apparatus 15 having the higher response rate, so that the load can be regulated to the target value with high accuracy.

Moreover, in the embodiment, an example has been described in which it is supposed that the electric power supply force of the power system 13 is fixed and the state of load on the power system 13 is changed depending on the operation state of the load apparatuses 15. However, the present invention is not limited to such configuration. When the electric power supply force of the power system 13 is changed, the power system 13 sometimes becomes the overload state even if the operation state of the load apparatuses 15 is not changed. For example, when part of electric power of the power system 13 is generated by wind power generation, the electric power supply force of the power system 13 is largely changed depending on the strength of wind. The present invention can be applied similarly even in the overload state effected by relative relation of load to the electric power supply force.

Second Embodiment

The basic configuration and operation of the second embodiment are the same as those of the first embodiment but in the second embodiment more concrete configuration and operation are provided or described.

FIG. 3 is a block diagram schematically illustrating an electric power demand regulating system according to the second embodiment. Referring to FIG. 3, the electric power demand regulating system includes an electric power demand regulating device 1100, consumers 1200, a power system 1300 and a communication network 1400.

The communication network 1400 is a general communication network including the Internet.

The power system 1300 includes distribution line 1301, equipment 1302, a load state measurement part 1303, an energy storage function part 1304, an energy storage state measurement part 1305 and a state transmission part 1306.

The distribution line 1301 is equipment for supplying electric power to the consumers 1200.

The equipment 1302 is equipment constituting the power system 1300 and, for example, distribution transformers and pole transformers correspond to the equipment.

The load state measurement part 1303 measures load applied to the equipment 1302.

The energy storage function part 1304 is an energy storage device installed in order to make the load on the distribution line 1301 and the equipment 1302 uniform in terms of time and a storage battery corresponds thereto, for example.

The energy storage state measurement part 1305 measures the amount of energy stored in the energy storage function part 1304. As measurement items, charged state information such as SOC (State of Charge) is considered when the energy storage function part 1304 is a storage battery.

The state transmission part 1306 transmits information of the load on the equipment 1302 measured by the load state measurement part 1303 and information the charged state of the energy storage function part 1304 measured by the energy storage state measurement part 1305 to the electric power demand regulating device 1100 through the communication network 1400.

The consumers 1200 are to receive electric power from the distribution line 1301 and concretely contain independent houses, apartment houses, factory equipment, commercial equipment and the like. A plurality of consumers 1200 are connected to the distribution line 1301 of the power system 1300. The consumers 1200 in the embodiment include apparatuses 1201 which are operated by electric power and connected to the distribution line 1301.

Further, the consumers 1200 also include a setting change part 1202 and a set result transmission part 1203.

The setting change part 1202 changes the operation state (for example, on or off of the power source) of the apparatuses 1201 in accordance with a change request for apparatus setting received from the electric power demand regulating device 1100 through the communication network 1400. The setting change part 1202 may be incorporated in the apparatuses 1201 or may be provided independent of the apparatuses 1201.

Moreover, with regard to change of the apparatus setting, a person of the consumer 1200 which has received the change request for the apparatus setting judges whether the person accepts the change request or not and when the person accepts the change request, the person may change the setting of the apparatus manually. In this case, the setting change part 1202 may indicate the contents of the change request to the person, for example, and may change the apparatus setting when an input to the effect that the person accepts the change request is received from the person.

The set result transmission part 1203 detects how the operation state of the apparatus 1201 is changed in accordance with the change of the apparatus setting by the setting change part 1202 and transmits the detection result to the electric power demand regulating device 1100 through the communication network 1400. The set result transmission part 1203 may be incorporated in the apparatuses 1201 or may be provided independent of the apparatuses 1201. For example, it is considered that when the set result transmission part 1203 detects the operation state of the apparatus 1201, the set result transmission part 1203 measures a current value reflecting the operation state of the apparatus 1201 to thereby monitor the operation state of the apparatus externally. Further, when the function of outputting the operation state information externally is included in the apparatus 1201, the set result transmission part 1203 may receive the information from the apparatus 1201.

The electric power demand regulating device 1100 includes a receiving part 1101, an overload judgment part 1102, a necessary stop amount calculation part 1103, a suppression response amount estimation part 1104, a stop shortage amount calculation part 1105, a response update part 1107, a regulation-force-for-each-apparatus prediction part 1109, a request transmittable frequency setting part 1111, a request transmission frequency counter 1112, a stop request information production part 1113 and a request transmission part 1114.

The receiving part 1101 receives a measurement value of load applied to the equipment 1302 and a measurement value of the energy storage state of the energy storage function part 1304 from the power system 1300 through the communication network 1400.

The overload judgment part 1102 judges the state that the amount of load applied to the equipment 1302 exceeds a predetermined threshold value as an overload state.

The necessary stop amount calculation part 1103 calculates the amount of load exceeding a predetermined permissible amount in the load applied to the equipment 1302 as a necessary stop amount.

The suppression response amount estimation part 1104 calculates the change amount of load on the equipment 1302 produced as the result that the operation state of the apparatus 1201 of the consumer 1200 is changed in response to a stop request (change request of apparatus setting) transmitted to the consumer 1200 by the electric power demand regulating device 1100.

The stop shortage amount calculation part 1105 compares the change amount of load calculated by the suppression response amount estimation part 1104 with the necessary stop amount calculated by the necessary stop amount calculation part 1103 and calculates the shortage amount as the stop shortage amount when the change amount of load calculated by the suppression response amount estimation part 1104 is smaller than the necessary stop amount calculated by the necessary stop amount calculation part 1103.

Here, the result of calculation performed in the receiving part 1101, the overload judgment part 1102, the necessary stop amount calculation part 1103, the suppression response amount estimation part 1104 and the stop shortage amount calculation part 1105 is further described with reference to FIG. 4.

FIG. 4 shows an example of the state of change of load applied to the equipment of the power system.

The horizontal axis of this drawing represents time and the vertical axis represents the amount of load applied to the equipment 1302.

UL in the drawing represents a value set as a maximum permissible value of load applied to the equipment 1302. USH represents a reference value for judgment of overload and when load 2001 exceeds USH, it is judged that the equipment is in the overload state. Thereafter, when the load 2001 is lower than UL as the result that the load is reduced, it is judged that the overload state is solved.

The reason that UL and USH are different is that it is prevented that the overload state and the solved state of overload are frequently repeated by repetition of small increase and decrease of load to thereby produce hunting of judgment frequently.

Triangular marks in the drawing represent timings that the stop request of load is transmitted to the consumer 1200. The numeral described in the triangular mark represents that the stop request thereof is issued in a sequence number corresponding to the numeral, that is, the numeral represents a sequence number in the number of times of transmission of the stop requests.

Operation of the receiving part 1101 to the stop shortage amount calculation part 1105 is now described along the flux of time.

Thick line 2001 in FIG. 4 represents the load applied to the equipment 1302. The value of the load is obtained by the receiving part 1101.

For example, at time t0, the magnitude of the load applied to the equipment 1302 exceeds UL but is smaller than USH which is the reference for overload judgment. Accordingly, at this time, it is judged that the equipment is not in the overload state.

Next, at time t1, the magnitude of the load applied to the equipment 1302 reaches P1. At this time, P1 which is the magnitude of the load applied to the equipment 1302 exceeds the reference USH for overload judgment. Accordingly, the overload judgment part 1102 judges that the equipment is in the overload state. Consequently, the necessary stop amount calculation part 1103 calculates the value obtained by subtracting UL from P1 (arrow 2002 in the drawing) as the necessary stop amount.

Now, this processing is the first processing of issuing the stop request to the apparatus 1201 of the consumer 1200 (1 is described in triangular mark) and accordingly the last stop request does not exist. Hence, the suppression response amount calculated by the suppression response amount estimation part 1104 is 0. Accordingly, the stop shortage amount calculated by the stop shortage amount calculation part 1105 is equal to the magnitude represented by arrow 2002 in the drawing.

Next, at the stage of issuing the second stop request to the apparatus of the consumer (2 is described in the triangular mark), the load on the equipment 1302 is reduced to P2 as a result of the last stop request. At this time, the suppression response amount calculated by the suppression response amount estimation part 1104 is equal to the magnitude obtained by subtracting P2 from P1 (the magnitude indicated by arrow 2003 in the drawing). The stop shortage amount calculated by the stop shortage amount calculation part 1105 is equal to the magnitude obtained by subtracting UL from P2 (the magnitude represented by arrow 2004 in the drawing).

Similarly, at the stage of producing information of the third stop request, the suppression response amount brought by the last stop request is equal to the magnitude represented by arrow 2005 in the drawing and the stop shortage amount is equal to the magnitude represented by arrow 2006 in the drawing. At time t4, the magnitude of the load 2001 is lower than UL and accordingly the equipment escapes from the overload state. Accordingly, in this example, regulation of the load is ended at the stage of transmitting the stop request of the load three times.

Return to FIG. 3.

An apparatus information DB 1106 records therein information of the apparatuses 1201 which are supplied with electric power from the distribution line 1301 to be operated. The contents of this DB are described in FIG. 5. FIG. 5 shows an example of a table format stored in the apparatus information DB 1106.

In FIG. 5, the "consumer ID" records therein numbers each given to each of the consumers 1200. The "apparatus ID" records therein numbers each given to each of the apparatuses 1201. Since the energy storage function part 1304 of the power system 1300 is not an apparatus installed in the consumer 1200, the consumer ID is blank, although a special number such as, for example, 999 is given as the apparatus ID and the energy storage function part can be treated without being distinguished from the apparatuses 1201 of the consumers 1200.

Next, the "apparatus classification" records therein category names such as a water heater and an air conditioner. The "rated output" records therein values of rated power in specifications of the apparatuses. When the energy storage function part 1304 is a storage battery, it is considered that the rated output is an output in case where 1C discharge (discharge is made at a current value that discharge is ended in one hour) is performed.

The "usual time operation state" shows operation state (on and off state of power source) of the apparatuses 1201 in each time zone when the consumers 1200 live without receiving the stop request. When the energy storage function part 1304 is a storage battery, the "usual time operation state" shows whether discharge can be made from the storage battery or not and when discharge can be made, OK is described therein.

The "response rate" represents the probability that the stop request of the apparatus 1201 transmitted from the electric power demand regulating device 1100 and received by the consumer 1200 is accepted to change the setting of the apparatus 1201 in each time zone. Here, three stages of High, Medium and Low are shown as the "response rate", by way of example.

The "request output flag" shows whether the electric power demand regulating device 1100 transmits the stop request or not in order to solve the overload state of the equipment 1302. 0 means that it is not transmitted and 1 means that it has been transmitted. Further, the "request output flag" is initialized (all 0) each time the overload judgment part 1102 judges that the equipment is in the overload state.

Return to FIG. 3.

A request result DB 1108 records therein the contents of the stop requests transmitted by the electric power demand regulating device 1100 to the consumer 1200 after the overload judgment part 1102 judges that the equipment is overloaded. FIG. 7 shows an example of a table which is stored in the request result DB 1108.

The "date" and the "control start time" are data and time that the overload judgment part 1102 judges that the equipment is overloaded. The "request sequence number represents a sequence number in the number of times of the load stop requests transmitted by the electric power demand regulating device 1100 to the consumer 1200 (means what sequence number in the number of times the load stop request is transmitted) from the time that the overload judgment part 1102 judges the overload state.

The "consumer ID" is a number given to each consumer 1200 and is common to that of the apparatus information DB 1106.

The "apparatus classification" and the "apparatus ID" are category name and apparatus ID of the apparatus of the destination to which the electric power demand regulating device 1100 transmits the stop request. The apparatus classification and the apparatus ID are common to the apparatus information DB 1106.

The "request contents" are the contents which the electric power demand regulating device 1100 requests to the apparatus 1201. OFF means that it is requested to stop the load.

The request result DB 1108 records therein the transmission contents of the stop requests from the time that the overload judgment part 1102 judges the overload state by the combination of the above elements.

Return to FIG. 3.

The response update part 1107 calculates a request acceptance rate (response rate) for each category of the apparatuses as a result of the last stop request of the load. When there exists the category having the high response rate, information of the response rate in the apparatus information DB 1106 is updated so that the request is made to the category preferentially from next time.

Figure 6:
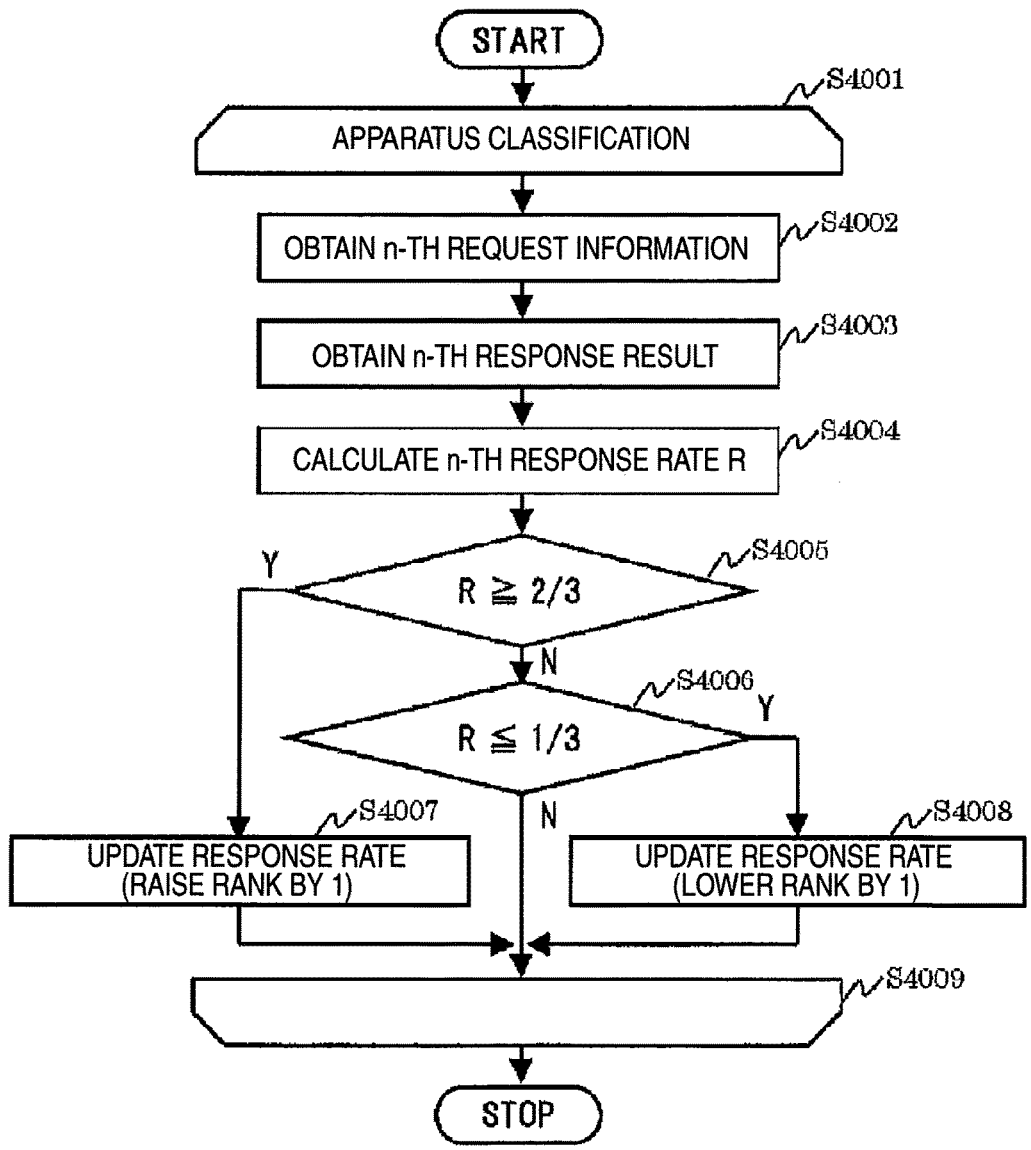
FIG. 6 is a flow chart showing operation of a response update part.

FIG. 6 is a flow chart showing operation of the response update part 1107.

Referring to FIG. 6, the response update part 1107 first performs loop processing in category units of the apparatuses 1201 in step S4001. For example, the processing is performed in order of the categories of water heaters, electric vehicle charging devices and air conditioners.

In step S4002, the n-th request information obtainment processing is performed. The response update part 1107 extracts the result information of the n-th stop request from the time that the overload judgment part 1102 judges the overload state with reference to the request result DB 1108.

In step S4003, the n-th response result obtainment processing is performed. The response update part 1107 collects information of the operation states of the apparatuses 1201 transmitted by the set result transmission part 1203 of the consumer 1200.

In step S4004, the processing of calculating the n-th response rate is performed. The response update part 1107 makes matching between the request contents obtained in step 4002 and the set contents (operation state) of the apparatuses 1201 obtained in step S4003 and calculates the response rate on the basis of the matching result. The response rate R is calculated by the expression (1).

[MATH. 1]

$$\text{Response Rate } R = \frac{\text{The Number of Apparatuses Having the Request Contents Indential With the Set Contents of the Apparatus 1201}}{\text{The Number of Apparatuses in Transmission Destination of the } n\text{-}th \text{ Request}} \quad (1)$$

In step S4005, the response update part 1107 compares the response rate R with the first threshold value. When the response rate is larger than this threshold value, the apparatus of the category is judged to have high response (High) as the classification of the response rate. Here, the threshold value is ⅔ as an example.

When the response rate is larger than or equal to ⅔, the processing of the response update part 1107 proceeds to step S4007, in which the response update part 1107 raises the rank of the classification of the response rate of the apparatus of this category recorded in the apparatus information DB 1106 by 1 uniformly. That is, when the classification of the response rate set until now is Medium, the classification is changed to High and when it is Low, the classification is changed to Medium. When the classification of the response rate set before change is High, the classification is not changed.

In step S4005, when the response rate does not reach the threshold value (⅔ in this example), the response update part 1107 compares the response rate with the second threshold value in step S4006. The second threshold value is smaller than the first threshold. When the response rate is smaller than the threshold value, the apparatus of the category is judged to have low response.

Here, the threshold value is set to ⅓ as an example. When the response rate is smaller than or equal to ⅓, the processing proceeds to step S4008, in which the rank of the classification of the response rate of the apparatus of the category recorded in the apparatus information DB 1106 is lowered by 1 uniformly. That is, when the classification of the response rate set until now is High, the classification is changed to Medium and when it is Medium, it is changed to Low. When it is already Low, it is not changed.

Hereafter, the response update part 1107 performs the processing of steps S4002 to S4008 for each category of the apparatuses 1201.

Here, the response rate is calculated by the expression (1) by way of example, although the present invention is not limited thereto. Since the value of the response rate shows the certainty of the magnitude of the stop power obtained upon the stop request, it is also considered to use a standard deviation, for example. In this case, it is considered that the value is smaller the certainty is higher, so that the same method can be used to realize the response update processing.

The recorded contents of the apparatus information DB 1106 reflect the response characteristics for each apparatus category by the above series of processing.

The regulation-force-for-each-apparatus prediction part 1109 calculates a stoppable load for each apparatus 1201 with reference to the apparatus information DB 1106 and transmits the stoppable load to the stop request information production part 1113 as regulation force information for each apparatus in combination with information of the response rate. The stoppable load for each apparatus is calculated by the expression (2):

[MATH. 2]

$$\text{Stoppable Load (kW)} = \text{Rated Power} \times \beta \quad (2)$$

where $\beta=1$ when the operation state in the time zone is on and $\beta=0$ when the operation state in the time zone is off A convenience influence DB 1110 records therein disadvantage suffered by the consumer 1200 by stopping the apparatus for each category of the apparatuses. FIG. 8 shows an example of a table format stored in the convenience influence DB 1110. In FIG. 8, as an example of the "apparatus classification", a system energy storage device, a water heater, an electric vehicle charging device (EV charging) and an air conditioner are described. Further, values of convenience deterioration level described in FIG. 8 are an example.

Even when the system energy storage device (the energy storage function part 1304 of the power system 1300) is forcedly discharged, there is no influence on living of the consumers 1200 and accordingly the convenience deterioration level thereof is set to 0. The water heater may be heated any time as far as the water is boiling until the time that hot water is demanded and accordingly it is considered that there is less influence on the convenience of the consumers 1200. However, under certain circumstances, there is a risk that a hot-water supply amount is lacking at the time that hot water is demanded. Accordingly, the convenience deterioration level of the water heater is set to 1. Even in the EV charging, as far as charging is completed until the time that EV is used next time, the charging may be made any time until the charging is completed. However, if the charging is stopped and the charged amount is lacking at the time that the EV is to be used, there occurs the situation that the EV cannot be used. Accordingly, here, the convenience deterioration level of the EV charging is set to 2. On the other hand, the air conditioner directly influences a comfort of the consumers 1200 when the air conditioner is stopped, and accordingly the convenience deterioration level is set to 3.

Return to FIG. 3.

The request transmittable frequency setting part 1111 sets a limit value for the number of times that the stop requests are transmitted to the apparatuses 1200 of the consumers 1200 from the electric power regulating device 1100. In this example, 10 is set as an example of the request transmittable frequency. This limit value may be fixed always or may be changed each time regulation control of the load is performed.

The request transmission frequency counter 1112 counts the stop requests of the apparatuses 1201 transmitted to the consumers 1200 from the electric power demand regulating device 1100 from the time that the overload judgment part 1102 judges the overload state.

The stop request information production part 1113 produces information for requesting change of the operation state of the apparatus 1201 of the consumer 1200 in order to reduce the load applied to the equipment 1302.

Figure 9:
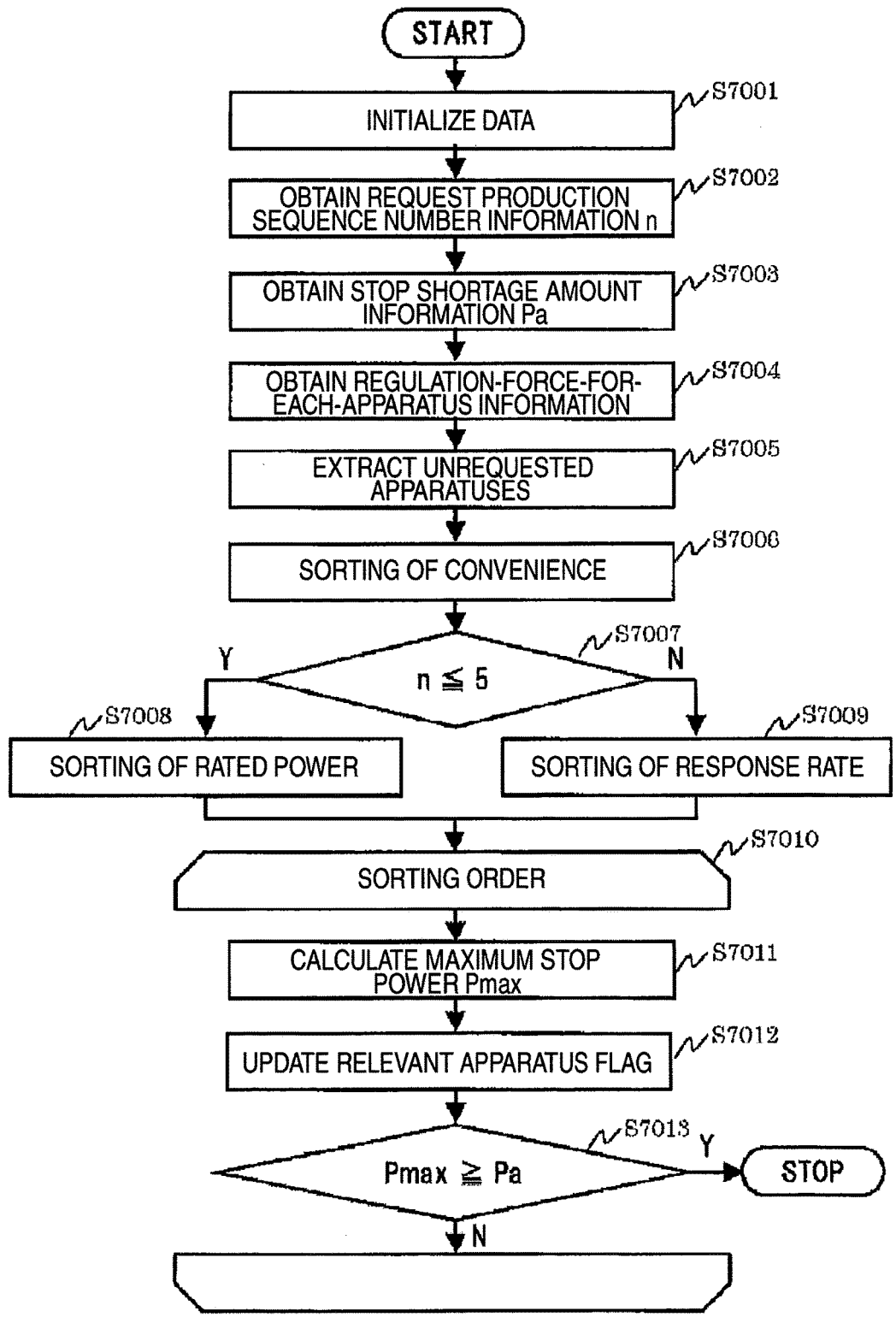
FIG. 9 is a flow chart showing operation of a stop request information production part.

Operation of the stop request information production part 1113 is shown by the flow chart of FIG. 9.

In step S7001, the stop request information production part 1113 initializes "maximum stop power Pmax" which is a variable used in the series of processing. In step S7002, the stop request information production part 1113 obtains request production sequence number information n from the request transmission frequency counter 1112. Further, in step S7003, the stop request information production part 1113 obtains stop shortage amount information Pa which is a calculation value of the stop shortage amount calculation part 1105. Moreover, in step S7004, the stop request information production part 1113 obtains the regulation force information for each apparatus which is a prediction result of the regulation-force-for-each-apparatus prediction part 1109. Furthermore, in step S7005, the stop request information production part 1113 refers to information of the request output flag of the apparatus information DB 1106 and extracts records having a value of 0 as unrequested apparatus extraction processing. Further, in step S7006, the stop request information production part 1113 rearranges the records extracted in step S7005 in order of small value of the convenience influence levels recorded in the convenience influence DB 1110 as convenience sorting processing.

Thereafter, in step S7007, the stop request information production part 1113 judges whether a value of load stop request frequency n is smaller than or equal to the threshold value. Here, as an example, 5 equal to a half of 10 set as the request transmittable frequency is set as the threshold value.

When the value of the load stop request frequency n is smaller than or equal to 5, the processing proceeds to step S7008. In step S7008, the stop request information production part 1113 further rearranges the records having the same convenience deterioration level in order of large rated power.

On the other hand, in step S7007, when the value of the load stop request frequency n is larger than 5, the processing proceeds to step S7009. In step S7009, the stop request information production part 1113 further rearranges the records having the same convenience deterioration level in order of high response rate.

After step S7008 or S7009, the processing of the stop request information production part 1113 proceeds to step S7010.

After step S7010, the processing is repeated in order of the records rearranged in steps S7006 and S7008 or steps S7006 and S7009.

In step S7011, the stop request information production part 1113 calculates the "maximum stop power Pmax" of the variable. The maximum stop power Pmax is calculated by the expression (3):

[MATH. 3]

$$\text{Maximum Stop Power } P\max = \Sigma_{record}(\text{Stoppable Load Obtained in Step } S7004) \quad (3)$$

In step S7012, the stop request information production part 1113 rewrites the request output flags of the apparatus information DB 1106 for the apparatus 1201 of the records to be subjected to the current loop processing of step S7010 from 0 to 1.

Next, in step S7013, the stop request information production part 1113 compares the maximum stop power Pmax with a value obtained by adding a fixed value a to the stop shortage amount Pa obtained in step S7003. When Pmax< (Pa+α) (N in step S7013), the stop request information production part 1113 returns to step S7010, in which the stop request information production part 1113 adds the apparatus 1201 to which the stop request is issued and performs the same processing (steps S7011 to S7013).

On the other hand, when Pmax≥(Pa+α), the stop request information production part 1113 ends the processing. All of the apparatuses 1201 subjected to the loop processing of step S7010 are the apparatuses 1201 to which the stop request is transmitted.

Figure 10:
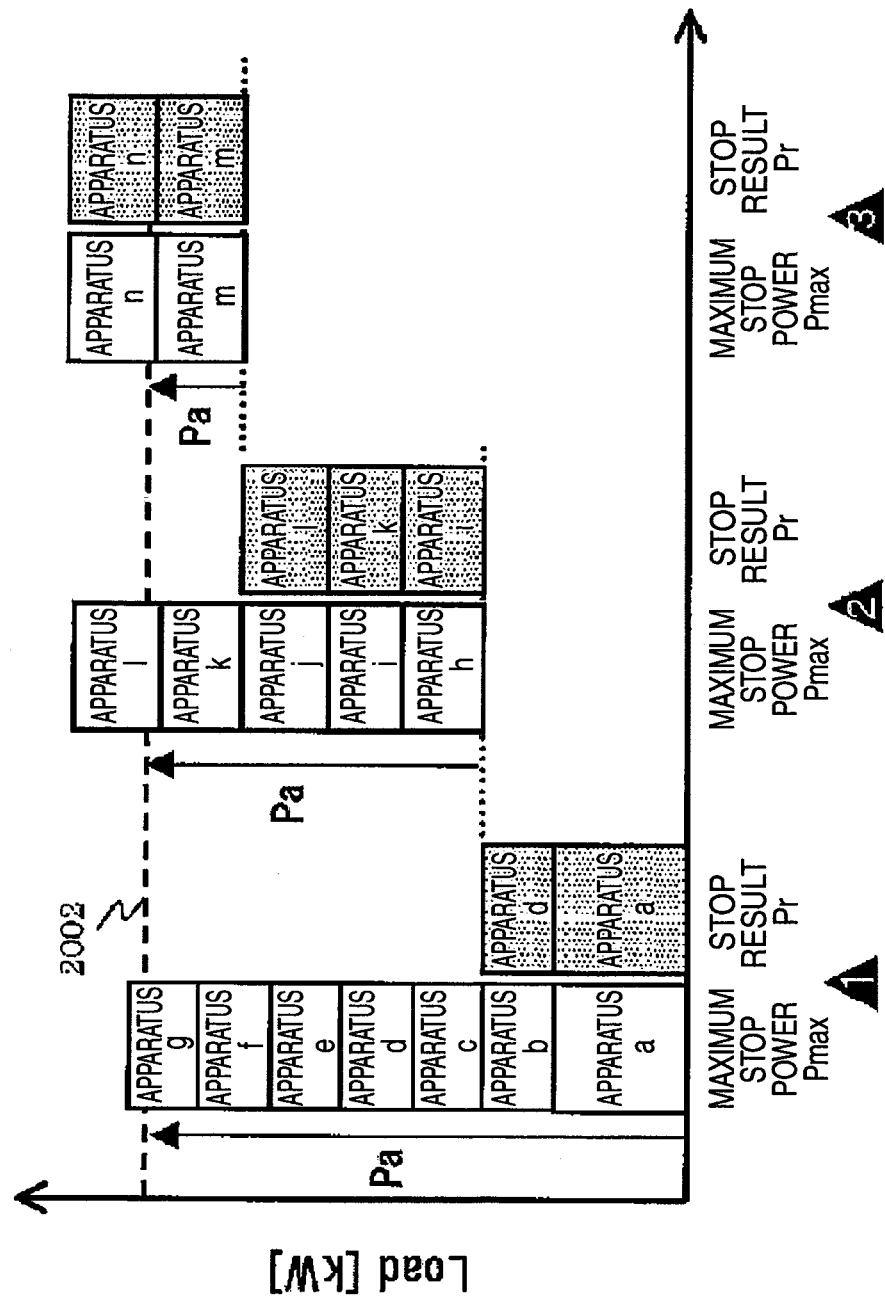
FIG. 10 is a graph illustrating the state of operation example of the stop request information production part.

FIG. 10 is a graph for illustrating the state of operation examples of the stop request information production part 1113. In FIG. 10, the horizontal axis represents the number of times of the stop requests. The maximum stop power Pmax and the results Pr of load stopped by transmission of the request are shown for each of the number of times of the requests. The vertical axis represents the load applied to the equipment 1302.

First, in the first stop request (1 is described in triangular mark), 7 apparatuses 1201 including apparatuses a to g are requested to stop the load thereon for the stop shortage amount Pa. As a result, the apparatuses a and d respond to the request. Until here, the series of processing shown in FIG. 9 is once ended.

Next, in the second stop request (2 is described in triangular mark), 5 apparatuses including apparatuses h to l are requested to stop the load thereon for the stop shortage amount Pa at that time. As a result, the apparatuses i, k and l respond to the request. Until here, the series of processing shown in FIG. 9 is performed again.

Further, in the third stop request (3 is described in triangular mark), the apparatuses m and n are requested to stop the load thereon for the stop shortage amount Pa at that time. As a result, both of the apparatuses m and n respond to the request. Similarly, until here, the series of processing shown in FIG. 9 is performed again.

The total of stop results until the processing for the third stop request exceeds the necessary stop amount 2002 and accordingly the fourth and subsequent stop requests are not required.

Return to FIG. 3.

The request transmission part 1114 transmits the load stop request to the apparatus of the record produced by the stop request information production part 1113.

As described above, according to the embodiment, since the stop requests are separately transmitted plural times to regulate the load amount, the apparatuses 1201 can be stopped certainly so that the necessary load can be reduced securely and the apparatuses 1201 cannot be stopped excessively when the overload state of the equipment 1302 constituting the power system 1300 is solved. Further, when the overload state is solved, reduction of convenience of the consumers 1200 in case where the apparatuses 1201 are stopped can be suppressed as small as possible.

Further, the electric power demand regulating devices 11 and 1100 of the above embodiments can be realized by executing a software program in which processing procedures of the parts constituting the device are prescribed by a computer.

Moreover, the embodiments of the present invention are examples for describing the present invention and the scope of the present invention is not limited to only the embodiments. The person skilled in the art can implement the present invention in various aspects without departing from the spirit and scope of the present invention.

REFERENCE SIGNS LIST

10 electric power demand regulating system
11, 1100 electric power demand regulating device
12, 1200 consumer
13, 1300 power system
14, 1400 communication network
15 load apparatus
21 judgment part
22 production part
23 transmission part
1101 receiving part
1102 overload judgment part
1103 necessary stop amount calculation part
1104 suppression response amount estimation part
1105 stop shortage amount calculation part
1106 apparatus information DB
1107 response update part
1108 request result DB
1109 regulation-force-for-each-apparatus prediction part
1110 convenience influence DB
1111 request transmittable frequency setting part
1112 request transmission frequency counter
1113 stop request information production part
1114 request transmission part 1201 apparatus
1202 setting change part
1203 set result transmission part
1301 distribution line
1302 equipment
1303 load state measurement part
1304 energy storage function part
1305 energy storage state measurement part
1306 state transmission part

The invention claimed is:

1. An electric power demand regulating system which regulates load applied to equipment of a power system by load apparatuses, the load apparatuses operated by electric power from the power system which supplies electric power to consumers, comprises
an electric power demand regulating device which makes selection of a load apparatus to be requested to make a change of an operation state on basis of a regulation target value which is an amount of load to be regulated and load information for each apparatus which is information of each load apparatus when the load on the equipment of the power system is regulated, the electric power demand regulating device outputting a change request for requesting to make a change of the operation state of the selected load apparatus plural times during a period from start to completion of regulation;
wherein the electric power demand regulating device counts the change requests outputted from start time of the regulation and changes a selection rule for selecting the load apparatus to be requested to make a change of the operation state when the count reaches a predetermined threshold value.

2. An electric power demand regulating system according to claim 1, wherein
the electric power demand regulating device updates the regulation target value after the change request is outputted and selects the load apparatus to be requested to make a change of the operation state at a next change request on basis of the updated regulation target value.

3. An electric power demand regulating system according to claim 1, wherein
the electric power demand regulating device selects the load apparatus to be requested to make a change of the operation state on basis of the regulation target value, the load information for each apparatus and degree of change in convenience of the consumers in case where the operation state of the load apparatuses is changed.

4. An electric power demand regulating system according to claim 1, wherein
the electric power demand regulating device maintains a request acceptance rate (response rate) representing a probability that the operation state is changed when the change request is received for each category of the load apparatuses while updating the response rate and the electric power demand regulating device selects the load apparatus to be requested to make a change of the operation state on basis of the regulation target value, the load information for each apparatus and the response rate.

5. An electric power demand regulating system according to claim 1, wherein
the electric power demand regulating device selects the load apparatus having large rated power preferentially before the count reaches the threshold value and selects the load apparatus having the high response rate preferentially after the count reaches the threshold value.

6. An electric power demand regulating system according to claim 1, wherein
the load apparatuses include electrical apparatuses installed in the consumers connected to the power system and operated by electric power from the power system and storage battery systems connected to the power system and making accumulation of electricity from the power system and discharge of electricity to the power system.

7. An electric power demand regulating device which regulates load applied to equipment of a power system by load apparatuses, the load apparatuses operated by electric power from the power system which supplies electric power to consumers, the electric power demand regulating device comprising:
a judgment part to decide that the load on the equipment is regulated;
a production part to select a load apparatus to be requested to make a change of an operation state on basis of a regulation target value which is an amount of load to be regulated and load information for each apparatus which is information of each load apparatus and produce a change request for requesting to make a change of the operation state of the selected load apparatus; and
a transmission part to output the change request to the consumers;
wherein the production part produces the change request plural times during a period from start to completion of regulation and the transmission part transmits the change request each time the change request is produced by the production part; and
wherein the production part counts the change requests outputted from start time of the regulation and changes a selection rule for selecting the load apparatus to be requested to make a change of the operation state when the count reaches a predetermined threshold value.

8. An electric power demand regulating device according to claim 7, wherein
the production part updates the regulation target value after the change request is outputted and selects the load apparatus to be requested to make a change of the operation state at a next change request on basis of the updated regulation target value.

9. An electric power demand regulating device according to claim 7, wherein
the production part selects the load apparatus to be requested to make a change of the operation state on basis of the regulation target value, the load information for each apparatus and degree of change in convenience of the consumers in case where the operation state of the load apparatuses is changed.

10. An electric power demand regulating device according to claim 7, wherein
the production part maintains a request acceptance rate (response rate) representing a probability that the operation state is changed when the change request is received for each category of the load apparatuses while updating the response rate and the production part selects the load apparatus to be requested to make a change of the operation state on basis of the regulation target value, the load information for each apparatus and the response rate.

11. An electric power demand regulating device according to claim 7, wherein
the production part selects the load apparatus having large rated power preferentially before the count reaches the threshold value and selects the load apparatus having the high response rate preferentially after the count reaches the threshold value.

12. An electric power demand regulating method of regulating load applied to equipment of a power system by load apparatuses, the load apparatuses operated by electric power from the power system which supplies electric power to consumers, the electric power demand regulating method comprising:
deciding that the load on the equipment is regulated;
selecting a load apparatus to be requested to make a change of an operation state on basis of a regulation target value which is an amount of load to be regulated and load information for each apparatus which is information of each load apparatus;
producing a change request for requesting to make a change of the operation state of the selected load apparatus to be outputted to the consumers plural times during a period from start to completion of regulation; and
counting the change requests outputted from start time of the regulation and changing a selection rule for selecting the load apparatus to be requested to make a change of the operation state when the count reaches a predetermined threshold value.

13. An electric power demand regulating method according to claim 12, further comprising:
updating the regulation target value after the change request is outputted and selecting the load apparatus to be requested to make a change of the operation state at a next change request on basis of the updated regulation target value.

14. An electric power demand regulating method according to claim 12, further comprising:
selecting the load apparatus to be requested to make a change of the operation state on basis of the regulation target value, the load information for each apparatus and degree of change in convenience of the consumers in case where the operation state of the load apparatuses is changed.

15. An electric power demand regulating method according to claim 12, further comprising:
maintaining a request acceptance rate (response rate) representing a probability that the operation state is changed when the change request is received for each category of the load apparatuses while updating the response rate and selecting the load apparatus to be requested to make a change of the operation state on basis of the regulation target value, the load information for each apparatus and the response rate.

16. An electric power demand regulating method according to claim 12, further comprising:
selecting the load apparatus having large rated power preferentially before the count reaches the threshold value and selecting the load apparatus having the high response rate preferentially after the count reaches the threshold value.

17. An electric power demand regulating system which regulates load applied to equipment of a power system by load apparatuses, the load apparatuses operated by electric power from the power system which supplies electric power to consumers, comprises an electric power demand regulating device which makes selection of a load apparatus to be requested to make a change of an operation state on basis of a regulation target value which is an amount of load to be regulated and load information for each apparatus which is information of each load apparatus when the load on the equipment of the power system is regulated, the electric power demand regulating device outputting a change request for requesting to make a change of the operation state of the selected load apparatus plural times during a period from start to completion of regulation;
wherein the electric power demand regulating device selects the load apparatus to be requested to make a change of the operation state on basis of the regulation target value, the load information for each apparatus and degree of change in convenience of the consumers in case where the operation state of the load apparatuses is changed;
wherein the electric power demand regulating device counts the change requests outputted from start time of the regulation and changes a selection rule for selecting the load apparatus to be requested to make a change of the operation state when the count reaches a predetermined threshold value; and
wherein the electric power demand regulating device selects the load apparatus having large rated power preferentially before the count reaches the threshold value and selects the load apparatus having the high response rate preferentially after the count reaches the threshold value.

18. An electric power demand regulating system according to claim 17, wherein
the electric power demand regulating device updates the regulation target value after the change request is outputted and selects the load apparatus to be requested to make a change of the operation state at a next change request on basis of the updated regulation target value.

19. An electric power demand regulating system according to claim 17, wherein
the electric power demand regulating device maintains a request acceptance rate (response rate) representing a probability that the operation state is changed when the change request is received for each category of the load apparatuses while updating the response rate and the electric power demand regulating device selects the load apparatus to be requested to make a change of the operation state on basis of the regulation target value, the load information for each apparatus and the response rate.

20. An electric power demand regulating system according to claim 17, wherein the load apparatuses include electrical apparatuses installed in the consumers connected to the power system and operated by electric power from the power system and storage battery systems connected to the power system and making accumulation of electricity from the power system and discharge of electricity to the power system.

* * * * *